US007215358B2

(12) United States Patent
Lee

(10) Patent No.: US 7,215,358 B2
(45) Date of Patent: May 8, 2007

(54) MOTOR-LESS AUTOMATIC EXTRACTION DEVICE SURVEILING INSIDE OF FURNACES

(75) Inventor: Hun-Yong Lee, Soowon (KR)

(73) Assignee: Youngkook Electronics, Seoul (KR)

( * ) Notice: Subject to any disclaimer, the term of this patent is extended or adjusted under 35 U.S.C. 154(b) by 360 days.

(21) Appl. No.: 10/486,359

(22) PCT Filed: Aug. 30, 2002

(86) PCT No.: PCT/KR02/01637

§ 371 (c)(1), (2), (4) Date: Feb. 27, 2004

(87) PCT Pub. No.: WO03/025487

PCT Pub. Date: Mar. 27, 2003

(65) Prior Publication Data

US 2004/0212675 A1 Oct. 28, 2004

(30) Foreign Application Priority Data

Sep. 1, 2001 (KR) .............................. 2001-53758

(51) Int. Cl.
*H04N 7/18* (2006.01)

(52) U.S. Cl. .......................................... 348/83; 348/82

(58) Field of Classification Search ............. 348/82–87
See application file for complete search history.

(56) References Cited

U.S. PATENT DOCUMENTS

| | | | | |
|---|---|---|---|---|
| 4,695,881 | A * | 9/1987 | Kennedy et al. | 348/83 |
| 4,840,474 | A * | 6/1989 | Heft et al. | 359/434 |
| 6,111,599 | A * | 8/2000 | Nance et al. | 348/82 |
| 6,239,831 | B1 * | 5/2001 | Eversole et al. | 348/83 |

* cited by examiner

*Primary Examiner*—Anand Rao
(74) *Attorney, Agent, or Firm*—Arent Fox LLP

(57) ABSTRACT

The present invention relates to a motor-less automatic retraction device that can insert a vision tube capable of monitoring the inside of a furnace to mange the internal state of the furnace and control the temperature of the furnace into the furnace and retract the vision tube from the furnace in a motor-less manner. A conventional retraction device is disadvantageous in that it is expensive, voluminous, difficult to install, thus requiring expert's help to install, and difficult to repair at the time of breakdown, and requires expensive repairing costs.

In order to overcome the above-described disadvantages, an object of the present invention is to develop a motor-less automatic retraction device that can insert the vision tube into the furnace and retract the vision tube from the furnace using a spring, so the device is easily to install due to its small size and lightweight, is easy to repair, and allows repairing costs to be reduced.

9 Claims, 3 Drawing Sheets

MOTOR-LESS AUTOMATIC EXTRACTION DEVICE SURVEILING INSIDE OF FURNACES

TECHNICAL FIELD

The present invention relates to a camera system for monitoring the inside of a furnace that allows the inside of the furnace to be observed so as to manage the internal state of the furnace and control the temperature of the furnace.

BACKGROUND ART

In general, industrial furnaces are classified into various types according to products produced by the furnaces.

For example, the furnace types include an industrial incinerator for incinerating wastes, a melting furnace for iron mills for melting metal, a gas furnace for melting glass, a cement furnace, a pottery furnace and a calcining furnace.

One of operators' common demands relating to various furnaces is to frequently observe the inside of a furnace during the operation of the furnace using clear images.

Once a furnace is operated, the furnace is continuously operated for a certain period of time as long as a particular breakdown does not occur. Accordingly, the inside of the furnace should be inspected by frequently observing the inside of the furnace during the operation of the furnace.

A conventional method of observing the inside of an industrial furnace is generally implemented by forming a hole having a certain size through the wall of the furnace, placing a door in front of the hole to be selectively opened and closed, and observing the inside of the furnace through the hole using the naked eye with the door being opened.

Such a conventional method is used in about 70% of furnaces. In order to protect the eye and intercept strong visible rays when observing the inside of a furnace by the above-described method, a user should use an additional face protector to which an infrared glass is attached.

However, the conventional method is disadvantageous in that the thermal efficiency of a furnace is reduced due to the forming of a hole through the wall of the furnace, combustion mixture ratio can be changed due to the inflow of outside air, a viewing angle for observing the inside of the furnace with the naked eye is restricted due to a small-sized and long hole in the wall of the furnace, and an operator may be burned.

In order to solve the above problems, there was proposed another conventional method of monitoring the inside of a furnace by forming a hole through the wall of the furnace, forming a window using quartz or heat-resistant glass, placing a camera and a camera protective housing outside the window, and photographing images formed on the window using the camera and lenses.

However, this conventional method has a limitation in the monitoring of the inside of a furnace because only limited images obtained through the hole formed through the wall of the furnace can be observed.

Additionally, the glass is strongly resistant to heat, but weak to impact, abrasion and corrosion. As time passes, dirt, such as soot generated by combustion in the inside of a furnace, adheres to the inside surface of the window, so the transparency of the window is deteriorated and clear images cannot be obtained, thus the window requiring continuous maintenance.

This conventional method is more advantageous than the first conventional method, but is not appropriate for a large-sized furnace, and a furnace's temperature must be controlled precisely.

There was proposed still another conventional method of inserting an image device called a lens tube into the inside of the furnace and observing the inside of a furnace through a monitor.

In accordance with this conventional method, lenses are arranged in a conventional lens tube 1 in a row, a camera protective housing 3 is connected to the back of the lens tube 1, and a general camera is disposed in the camera protective housing.

As illustrated in FIG. 1, the housing 4 is mounted on a cylinder rail 7 with a housing support 6 attached to the cylinder rail 8. The lens tube 1 is inserted into a furnace by supplying compressed air through the compressed air supply valve 25 to the cylinder rail and therefore moving the housing support 6 so as to photograph and monitor the inside of the furnace. In the case of an abnormal situation, such as a checkup, a power failure or the interruption of compressed air, the lens tube 1 is retracted from the furnace by supplying compressed air to the compressed air supply valve 25 disposed on the front portion of the cylinder rail so as to protect the lens tube 1 from high temperature heat inside the furnace.

The image of the inside of the furnace is passed through lenses arranged in the lens tube 1 in a row, and transmitted in and formed in the image sensor disposed in the camera protective housing 3. Thereafter, the image is passed through the electric control box 30 and displayed on a control center monitor 100, so the monitoring of the inside of the furnace is enabled.

In this case, since the inside of the furnace has a high temperature, specially fabricated camera protective housing 3 and the lens tube 1 are cooled by compressed air supplied from the air control box 31 to protect them. Thereafter, the supplied compressed air is discharged to the outside along a certain path.

However, since the system for monitoring the inside of the furnace described above employs the cylinder type retraction device and the camera protective housing 4, and therefore additional structures are required to fixedly attach them to the system, the system becomes large, power is required and so causes breakdown, and maintaining and purchasing costs are high.

DISCLOSURE OF THE INVENTION

An object of the present invention is to develop a motor-less automatic retraction device that is capable of inserting a small-sized lightweight vision tube 12 for monitoring the inside of a furnace into the furnace and retracting it from the furnace.

In order to accomplish the above object, the present invention employs a lightweight vision tube 12 equipped with a small-sized camera instead of a conventional lens tube 1 and a camera protective housing 3.

As illustrated in FIG. 3, in the case of repair, a power failure or the interruption of compressed air, a signal generated in a control box 14 is sent to an electric locking device 15 using a solenoid, so the vision tube 12 is automatically retracted in a motor-less manner, thus protecting the lens tube 12 from high temperature heat inside the furnace.

In this case, in order to protect the vision tube 12 being inserted into the furnace from high temperature heat, compressed air is supplied from the control box 14 as shown in FIG. 5 and discharged through the front portion of the vision tube.

In brief, the present invention provides a motor-less automatic retraction device for a vision tube for monitoring the inside of a furnace by which an operator can observe and monitor the images of the inside of the furnace through a monitor 100.

DESCRIPTION OF REFERENCE NUMERALS OF PRINCIPAL PARTS

Figure 1:
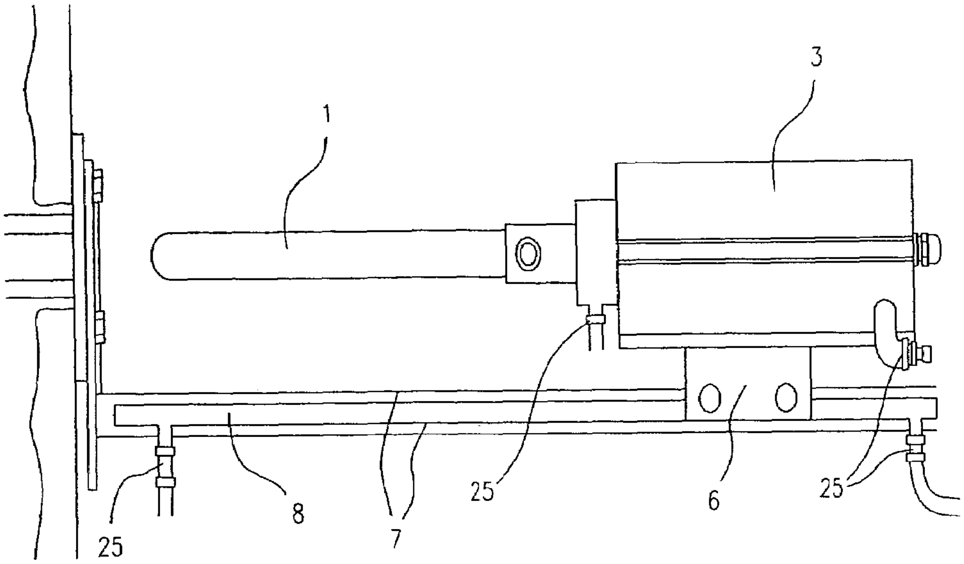
FIG.1 (PRIOR ART)
FIG. 1 is a schematic diagram showing a conventional furnace monitoring system employing a retraction device using a cylinder and a camera protective housing according to an embodiment of the prior art.
Figure 2:
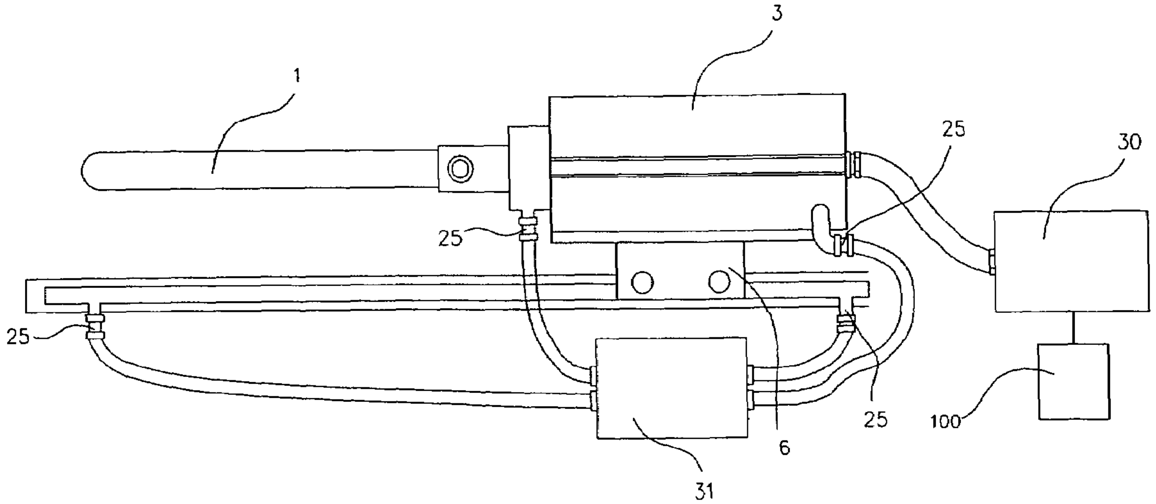
FIG.2 (PRIOR ART)
FIG. 2 is a diagram showing another conventional furnace monitoring system according to another embodiment of the prior art.

1: lens tube 3: camera protective housing
6: housing support 5: cylinder rail 8: cylinder
12: vision tube 13: spring 14: control box
10: image input hole 11: front end lens 12: vision tube
15: electric locking device 17: vision tube coupling bracket
18: carriage plate 20: wall sleeve
21: flange 22: frame 23: latch
25: compressed air supply valve 28: shock absorber
29: protective cap 30: electric control box
31: air control box 100: monitor

BEST MODE FOR CARRYING OUT THE INVENTION

With reference to the accompanying drawings, a system for monitoring the inside of a furnace according to the present invention is described.

In order to monitor the inside of a furnace, a carriage plate 18 connected to a coupling bracket 17 is coupled to a rail 19 as shown in FIG. 7, a wall sleeve 20 and a flange 21 of the vision tube 12 are brought into contact with each other to prevent supplied compressed air from leaking, and an electric locking device 15 mounted on a frame 22 and a latch 23 mounted on the coupling bracket 17 are interlocked with each other.

Figure 3:
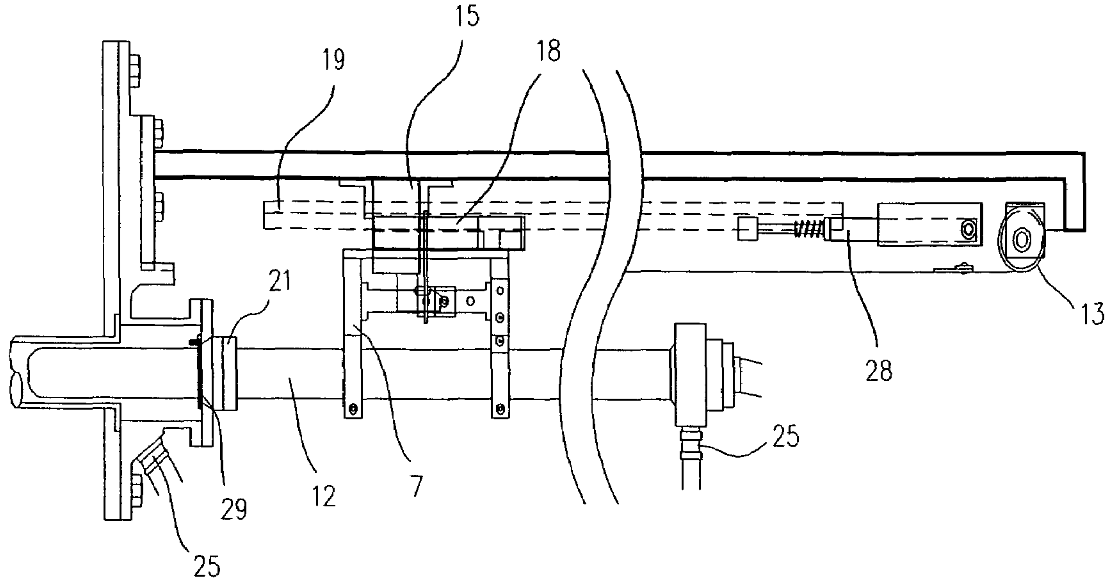
FIG. 3 is a schematic view of a motor-less automatic retraction device using a mainspring and a vision tube when a vision tube is inserted into the inside of a furnace, in accordance with the present invention.

As shown in FIG. 3, the vision tube 12 is inserted into an entrance of the furnace with a spring 13 fixedly attached at its one end to the coupling bracket 17 and at its other end to the frame 22. In the present invention, the lens tube is automatically retracted from the inside of a furnace by the elasticity of the spring 13 in a non-power manner, rather than by a cylinder or motor requiring power supply.

In the above case, the electric locking device 15 functions to prevent the vision tube 12 from being randomly retracted by the elasticity of the spring fastened to the frame 22, and to allow the automatic retraction of the vision tube 12 by detecting an abnormal situation such as the switch manipulation of an operator for automatic retraction, a power failure or the interruption of compressed air and unlock the electric locking device 15 and the latch 23 mounted on the coupling bracket 17.

An image of the inside of a furnace intended to be observed passes through an object lens 16 via a small hole formed in the front of the vision tube 12, sent to a detachable eye piece made in a convex lens and relay lenses 1, passes through an optical attenuation filter, sent to the control box 14 through the small-sized camera positioned behind the vision tube 12, and transmitted to the monitor 100 of a central control center, thus allowing the inside of the furnace to be monitored by an operator.

In addition, the present invention cools the vision tube with compressed air to protect the vision tube 12 inserted into the furnace from high temperature heat.

In this case, the compressed air used to protect the vision tube is supplied at a site, sent to the control box 14, purified in the control box 14 through a filter to remove dirt, and supplied at constant pressure through a pressure switch.

The supplied compressed air is sent to a compressed air supply valve 25 connected to the rear end of the vision tube through a compressed air supply pipe, supplied to the vision tube 12 and the compressed air valve 25 of the wall sleeve 20 mounted on the wall of the furnace to protect the vision tube 12, passed through a space between the vision tube 12 and the hole of the furnace, and discharged into the furnace through the vision tube 12, thus allowing the vision tube 12 to resist high temperature heat using a cooling effect generated by the discharging of the compressed air.

Figure 4:
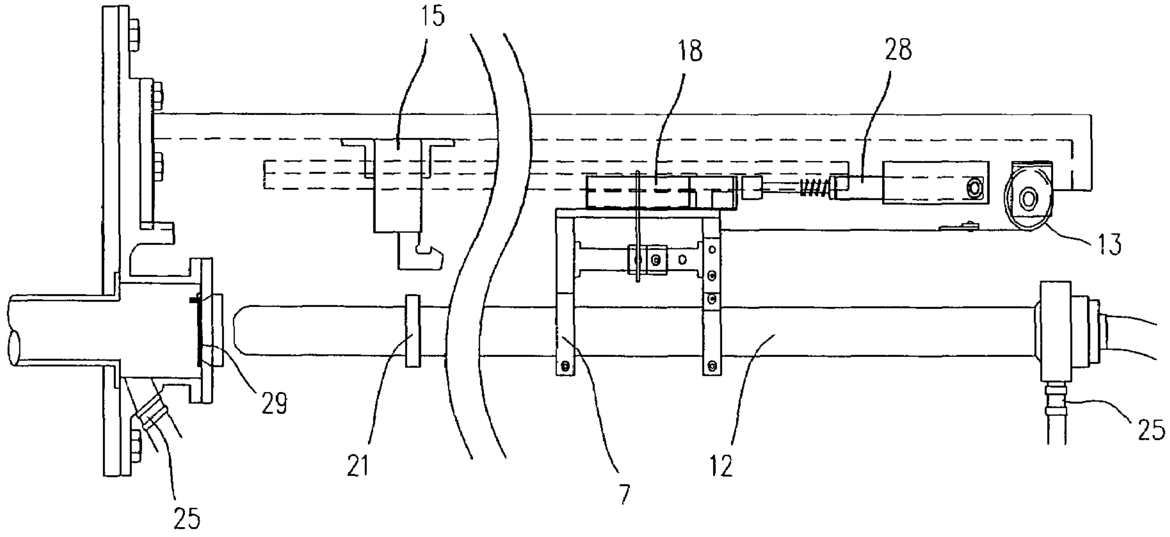
FIG. 4 is a schematic view of a motor-less automatic retraction device using a mainspring and a vision tube when a vision tube is retracted from the inside of a furnace, in accordance with the present invention.
Figure 5:
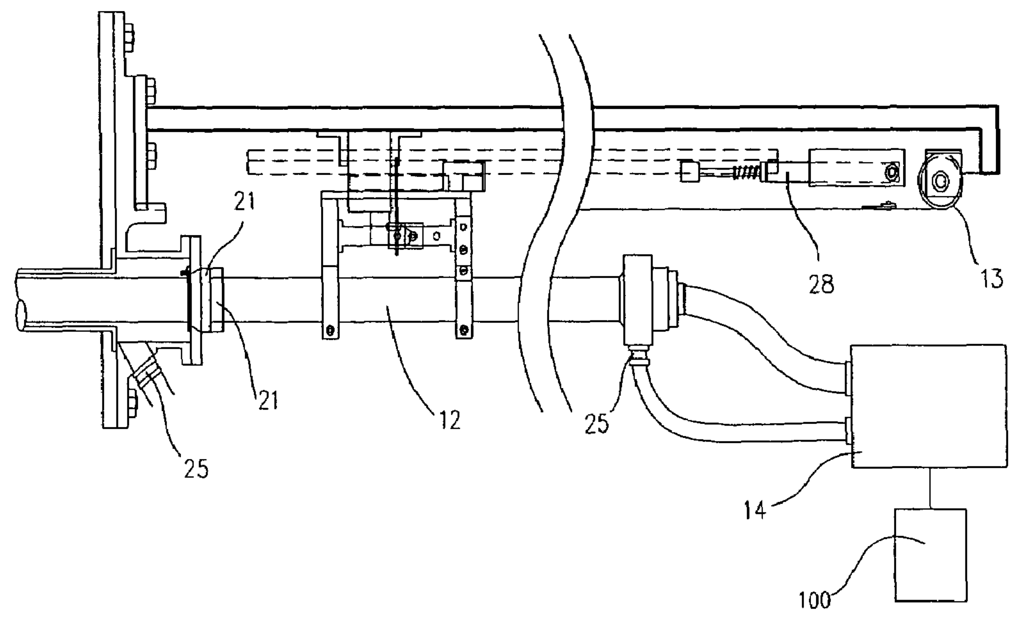
FIG. 5 is a view showing a construction of a system for monitoring the inside of a furnace in accordance with an embodiment of the present invention.
Figure 6:
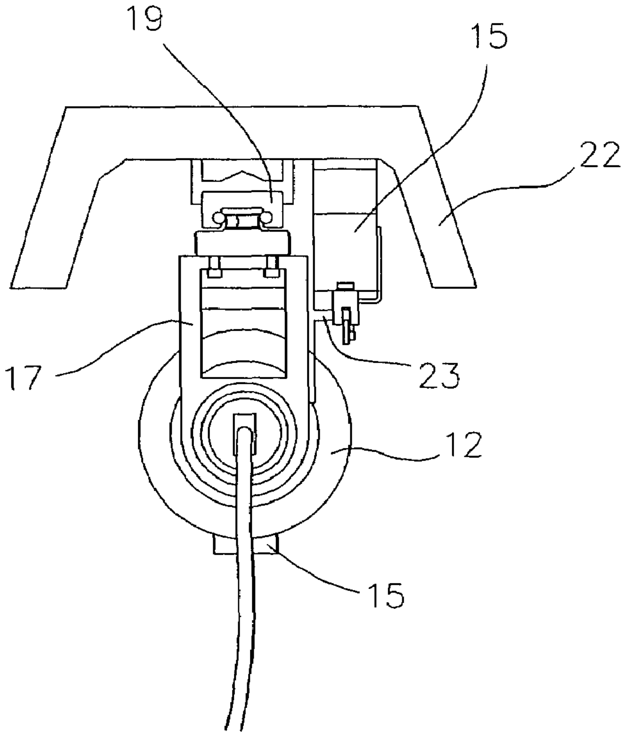
FIG. 6 is a rear view of the system for monitoring the inside of the furnace in accordance with the embodiment of the present invention.

FIG. 4 is a schematic view of a motor-less automatic retraction device using a mainspring and a vision tube when a vision tube is retracted from the inside of a furnace, in accordance with the present invention. When the operator manipulates the switch of the control box 14 to manually retract the vision tube for the repairing of the vision tube providing the images of the inside of the furnace, compressed air is not supplied to the vision tube or compressed air is supplied at less than a certain pressure, the pressure switch contained in the control box 14 detects the state and automatically transmits a signal to the electric locking device 15 and the electric locking device 15 unlocks the system, so the vision tube 12 is automatically retracted by the elasticity of the spring in a motor-less manner.

In that case, in order to protect the vision tube retracted by the elasticity of the spring, a shock absorber is mounted on the frame 22 at a position to which the coupling bracket 17 of the vision tube 12 retracted to buffer impact.

In order to protect persons or the like from flames discharged from the inside of the furnace due to a pressure difference, at the same time that the vision tube is automatically retracted and passed through the entrance of the wall sleeve 20, a cap 29 automatically blocks the entrance of the wall sleeve 20 and intercepts flames.

INDUSTRIAL APPLICABILITY

A motor-less automatic retraction device for inserting and retracting a vision tube 12 comprised of block type lenses and a small-sized camera employs a convenient and lightweight structure instead of the structure of a conventional voluminous and difficult-to-install retracting device, so a general user can easily install the device. Additionally, with a spring 13, in the case of an abnormal situation, such as a repair/checkup, a power failure or the interruption of compressed air, a signal generated in a control box 14 is sent to an electric locking device 15 using a solenoid, so the vision tube 12 is automatically retracted in a motor-less manner, thus preventing the causes of breakdown generated when the vision tube 12 is retracted using power.

In addition, the present invention allows high performance products to be manufactured and provided at low costs, so the inside of a furnace used in an iron mill, a cement factory, an incinerator and a power plant can be continuously monitored and the reliability and quality of products are improved, thus significantly developing industrial furnace industry.

The invention claimed is:

1. In a system for monitoring an inside of a furnace inaccessible to an operator through a hole formed in a wall of the furnace, a motor-less automatic retraction device, comprising:

a wall sleeve for cooling and protecting a vision tube by being brought into contact with a flange to prevent compressed air supplied from a control box and discharging the compressed air through a space between the inside of the furnace and the vision tube;

a locking device connected to a vision tube bracket by a latch, wherein the bracket is directly fixed to the vision tube at a first part and to a spring at a second part, the latch being fastened to the bracket at the time of being inserted into the furnace so as to prevent the vision tube from being randomly retracted by elasticity of the spring, and to allow automatic retraction by automatically releasing the vision tube from interlocking with the locking device in response to a signal from a control box during an abnormal situation, including at least one of switch manipulation of an operator for automatic retraction, a power failure or pressure reduction of the compressed air; and a shock absorber for buffering impact when the vision tube is inserted into the inside of the furnace with a carriage plate attached to a rail and retracted from the inside of the furnace by the spring.

2. The motor-less automatic retraction device as set forth in claim 1, wherein the spring used to automatically retract the vision tube is a mainspring.

3. The motor-less automatic retraction device as set forth in claim 1, wherein the spring used to automatically retract the vision tube is a coil spring.

4. In a motor-less automatic retraction device of claim 1, an electric locking device adapted to function to prevent the vision tube from being randomly retracted by elasticity of the spring by being interlocked with a latch fastened to a vision tube bracket at the time of being inserted into the furnace, and to allow the motor-less automatic retraction device to be operated by receiving a signal from a control box at an abnormal situation such as switch manipulation of an operator for automatic retraction, a power failure or pressure reduction of compressed air and unlocking the electric locking device and the latch.

5. The motor-less automatic retraction device as set forth in claim 1, wherein the bracket is disposed between the spring and the vision tube.

6. In a system for monitoring an inside of a furnace inaccessible to an operator through a hole formed in a wall of the furnace, a motor-less automatic retraction device, comprising:

a wall sleeve for cooling and protecting a vision tube by being brought into contact with a flange to prevent compressed air supplied from a control box and discharging the compressed air through a space between the inside of the furnace and the vision tube;

an electric locking device designed to be interlocked with a latch fastened to a vision tube bracket at the time of being inserted into the furnace so as to prevent the vision tube from being randomly retracted by elasticity of the spring, and to allow automatic retraction by automatically releasing the vision tube from interlocking with the locking device and unlocks the electric locking device from latch in response to a signal from a control box during an abnormal situation, including at least one of switch manipulation of an operator for automatic retraction, a power failure or pressure reduction of the compressed air; and a shock absorber for buffering impact when the vision tube is inserted into the inside of the furnace with a carriage plate attached to a rail and retracted from the inside of the furnace by the spring.

7. The motor-less automatic retraction device as set forth in claim 6, wherein the spring used to automatically retract the vision tube is a mainspring.

8. The motor-less automatic retraction device as set forth in claim 6, wherein the spring used to automatically retract the vision tube is a coil spring.

9. The motor-less automatic retraction device as set forth in claim 6, wherein the bracket is disposed between the spring and the vision tube.

* * * * *